(12) United States Patent
Savoyard et al.

(10) Patent No.: US 6,585,095 B2
(45) Date of Patent: Jul. 1, 2003

(54) OIL COOLING OF CLUTCH PACKAGE

(75) Inventors: James P Savoyard, Fairhaven, MI (US); James R Klotz, Mt. Clemens, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/184,173

(22) Filed: Jun. 28, 2002

(65) Prior Publication Data

US 2002/0162721 A1 Nov. 7, 2002

Related U.S. Application Data

(63) Continuation of application No. 09/633,595, filed on Aug. 7, 2000, now abandoned.

(51) Int. Cl.[7] .............................................. F16D 13/72
(52) U.S. Cl. ............................... 192/70.12; 192/113.34
(58) Field of Search ............................ 192/70.12, 70.2, 192/85 AA, 113.34, 113.35, 113.36

(56) References Cited

U.S. PATENT DOCUMENTS

| | | |
|---|---|---|
| 1,453,599 A | 5/1923 | Parker |
| 3,648,814 A | 3/1972 | Barron |
| 3,982,618 A * | 9/1976 | Horsch .................. 192/113.35 |
| 4,207,969 A | 6/1980 | Howell |
| 4,958,753 A | 9/1990 | Nogle |
| 5,755,314 A * | 5/1998 | Kanda et al. ............ 192/70.12 |
| 5,964,329 A * | 10/1999 | Kawaguchi et al. ......... 192/3.3 |

FOREIGN PATENT DOCUMENTS

| | | |
|---|---|---|
| JP | 3-239818 | 10/1991 |
| JP | 3-239819 | 10/1991 |
| JP | 4-300427 | 10/1992 |
| JP | 6-50353 | 2/1994 |

* cited by examiner

*Primary Examiner*—Richard M. Lorence
(74) *Attorney, Agent, or Firm*—Thomas A. Jurecko

(57) ABSTRACT

An oil cooling arrangement for a stacked plate type clutch assembly is provided. The stacked plate clutch assembly includes a stacked plate arrangement of alternating separator plates and clutch plates housed within a retainer. The oil cooling arrangement includes a flow passage structure arranged relative to the retainer for providing a secondary oil flow path in addition to a flow path through the stacked plate clutch assembly.

3 Claims, 4 Drawing Sheets

OIL COOLING OF CLUTCH PACKAGE

CROSS-REFERENCE TO RELATED APPLICATIONS

This application is a Continuation Application of Ser. No. 09/633,595 filed on Aug. 7, 2000, now abandoned. The disclosure of which is incorporated herein by reference.

BACKGROUND OF INVENTION

1. Field of Invention

The present invention relates to an improved cooling system for a transmission clutch package employing a plurality of alternately spaced steel separator plates and friction discs for connecting rotating members in a planetary gear train of an automatic transmission. More specifically, a specialized additional and secondary oil cooling system is described utilizing oil flowing at an accelerated rate for cooling steel clutch plates for conducting heat from the clutch package.

2. Description of Related Art

Generally, the steel separator plates currently used in clutch packages of vehicle transmissions are formed by sheet metal stamping. This produces a flat shaped plate with a thickness of about 2 mm. Anti-rotation lugs are formed around an outer edge periphery. These anti-rotation lugs engage splines of a clutch retainer structure. A plurality of clutch discs are positioned alternately or between the separator plates. The clutch discs have a friction facing material on both sides for contact with an adjacent separator plate. Splines formed on the disc's inner edge connect the discs to a rotating member or shaft of the transmission. The resultant stack of separator plates and clutch discs are pressed together by a hydraulically powered piston.

An disadvantage of this construction is the steel separator plates are not thick enough to conduct heat rapidly away from the contact surface through the outer lugs and to the clutch retainer. Another disadvantage of this construction is that the whole surface of the steel separator plate which faces the friction material on the clutch disc continuously generates heat. Yet a further disadvantage is caused by the practice of cutting grooves in the friction material to allow oil to flow between the separator plates and the clutch discs which decreases the amount of friction material available for connecting the members together. Still a further disadvantage is caused upon compression of the grooved friction material of the clutch discs which reduces the flow size of oil cooling grooves.

SUMMARY OF THE INVENTION

It is an object of the present invention to provide a secondary and additional oil cooling system for a clutch package utilizing oil flow over and along plates of the clutch structure to lower the temperature.

It is another object of the present invention to provide a clutch cooling system including a structure including a laminated plate composite configured to form oil cooling circuits between pairs of plate members for conducting heat always form a clutch package.

It is a still further object of the present invention to provide a separator plate assembly for a clutch package, which is constructed of two identical stamped steel parts.

It is yet another object of the present invention to provide a cooler running clutch package to enhance the life of friction material by reducing the degree of accelerated wear associated with higher temperature.

It is still another object of the present invention to provide an indexing feature on each separator plate to assure positive locating of cooling surfaces when two separator plates are assembled side to side.

It is yet still another object of the present invention provide cooling of the separator plates of a clutch package so as to lower temperatures wherein associated friction surfaces exhibit greater adherence leading to increased efficiency and elimination of at least one clutch disc.

It is a further object of the present invention to reduce the axial length of a transmission by shortening a clutch package which is accomplished by more efficient cooling using oil cooled separator plates and decreasing the number of clutch discs.

It is yet a further object of the present invention to provide a separator plate with strategic oil-cooled channels coined into a face of the plate for cooling oil flow resulting in decreased temperatures and more efficient performance.

To achieve the foregoing objects, the present clutch package has a clutch cooling system using a two-piece steel separator plate assembly using identically formed plate members and with an indexing mechanism to register the two plates together for forming central oil cooled passages resulting in lower operating temperatures.

One advantage of the present invention is that the two-piece steel separator plate assembly is fabricated from a single common stamping.

Still another advantage of the present invention is lower operating temperature as provided by the non-frictional oil cooling surface provided by the two-piece steel separator plate which decreases friction induced wear of the associated frictional surfaces.

A further advantage of the present invention which lowers transmission running temperatures is the increase in frictional effect between the separator plates and clutch discs thereby allowing removal of at least one clutch disc from the clutch package thereby allowing for a shorter transmission which is easier to package in a vehicle.

Yet a further advantage of the present indexed separator plate assembly is a projection formed on the separator plates that assures proper assembly of each pair of plate members into a composite separator assembly.

Yet another advantage of the present invention is providing an increase in oil life by a corresponding decrease in the instantaneous temperature rise of the clutch package occurring at the interface of the frictional material and the steel separator plates during a shift.

Other features and advantages of the present invention will be readily subsequent description taken in conjunction with the accompanying drawings.

DETAILED DESCRIPTION OF INVENTION

Figure 1:
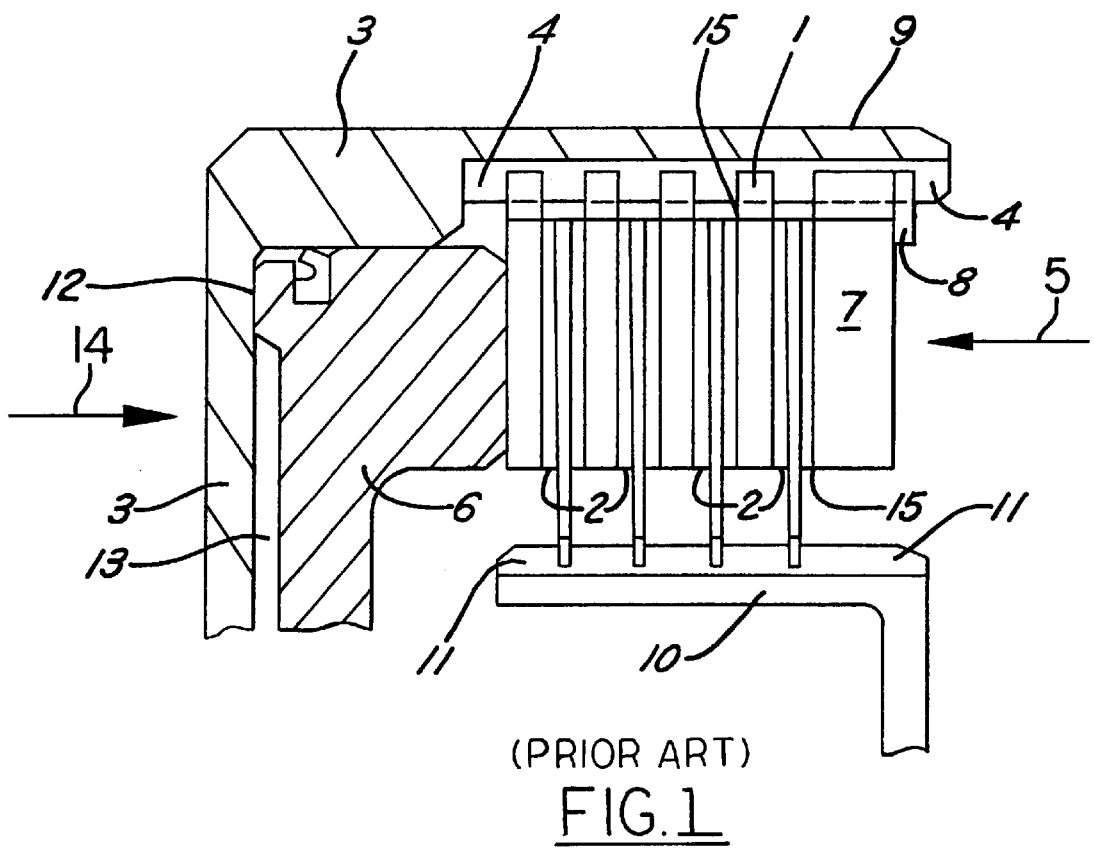
FIG. 1 is a side sectional view of a prior art automatic transmission clutch package showing single thickness, one-piece steel separator plates.

In FIG. 1, a prior art type clutch package for an automatic transmission is shown in place between clutch input and output retainers. The clutch package has a plurality of spaced one-piece steel separator plates 1 and friction clutch discs 2. The plates 1 and discs 2 are stacked end to end in a manner so that a plate 1 alternates with a disc 2. The outer edge of each plate 1 is anchored to or supported relative to a retainer member 3 at a splined formation 4 of member 3. The separator plates 1 and clutch discs 2 are alternately stacked or are assembled along splines 4 and in the direction of arrow 5 against a hydraulically applied piston 6 movable to the right in FIG. 1. The separator plates 1 and clutch discs 2 form a package that is then secured to retainer member 3 by an end pressure plate 7 and snap ring retainer 8. The clutch assembly 9 including members 1, 2, 3, 6, 7 and 8 is then selectively connectable to a rotating element or member 10 by a plurality of splines 11 formed thereon. Specifically, each of the clutch discs is retained at an inner edge to the splines of rotating member 10.

Normally, when the piston 6 is in the unapplied or inactive position shown in FIG. 1, the leftward end edge of the piston 6 engages surface 12 of the retainer member 3. In this inactive phase, the clutch discs 2 are rotated along with the member 10 while the separator plates remain unaffected and still along with the retainer member 3. When the oil cavity 13 at the end of piston 6 is pressurized, the hydraulic pressure causes movement of piston 6 to the right in the direction of the arrow 14. This movement presses the steel separator plates 1 and clutch discs 2 together and locks or connects retainer member 3 to the rotating member 10. It should be understood that when steel separator plates 1 and clutch discs 2 are in the above described locked mode, there is no path therebetween for flow of oil over friction surfaces 15 therebetween. Therefore, frictional heat is not conducted away from the clutch assembly 9.

Figure 2:
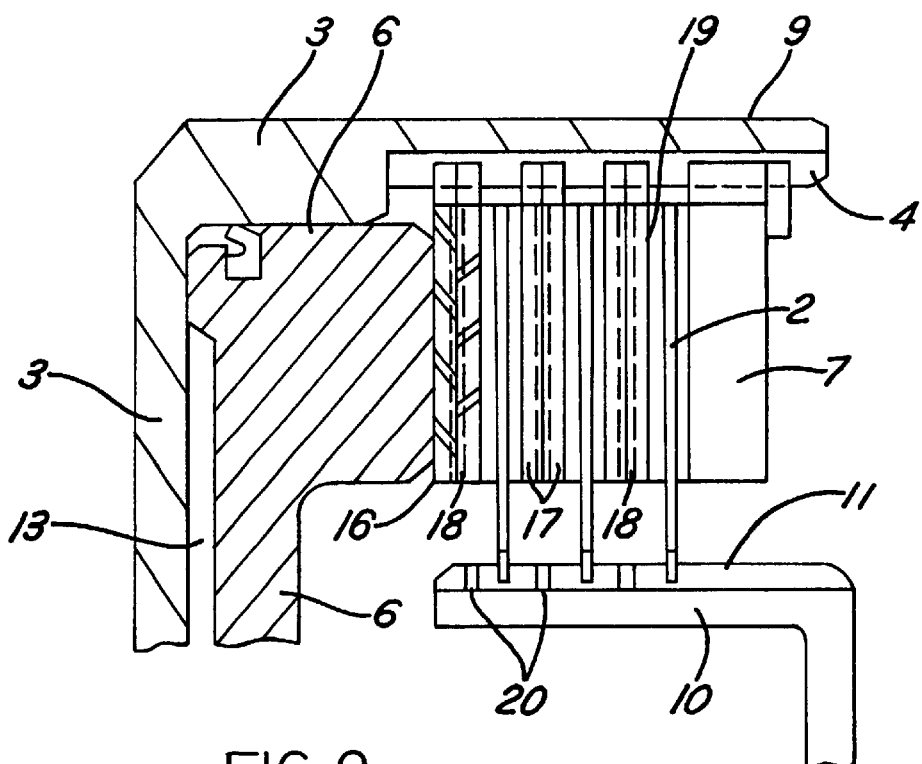
FIG. 2 is a side sectional view of an automatic transmission with the subject improved clutch package showing two-piece steel separator plates and with one of the clutch discs eliminated.

In FIG. 2, similar parts to those in FIG. 1 are labeled the same. The clutch assembly 9 provides a two-piece separator plate assembly 16 in place of the one-piece plate 1 in FIG. 1. Assembly 16 is fabricated from two identically formed parts by a simple stamping operation. An oil cooling channel 18 is formed in an end face of the separator plate. It should be noted that the oil cooling channel 18 does not contact the frictional material 19 on the clutch discs 2. Heat created from the relative rotation at the interface of a separator plate and a clutch disc is transmitted to oil flowing through the channel 18 formed between two separator plates of a two-piece assembly.

The cooling channels 18 always rotate or move at the same speed as the clutch package 9 due to the connection between the two-piece separator assemblies 16 and the retainer 3 at splines 4. When the clutch is activated, oil from the central region of the transmission is thrown radially outward by the centrifugal effect of moving parts such as element 10. Some of the oil passes through a series of lubrication holes 20 in member 10 and migrate to one of the cooling channels 18 between plates of the two-piece separator plate assembly. The oil flows through the channels 18 and exits at splines 4 formed by member 3. It should be appreciated, as the rotative speed of the clutch package 9 increases, the velocity and volume of oil for the cooling passage through channels 18 increase and therefore dissipate or carry away greater heat energy.

Due to many factors, a decreased operating temperature of oil and the entire clutch package 9 permits elimination of at least one of the clutch discs and therefore shortening of the package. Also, it is no longer desirable or necessary to cut oil grooves in the friction material carried by the clutch disc 2 and thus friction material can be deleted without decreasing contact area between the discs and separator plates.

Figure 3:
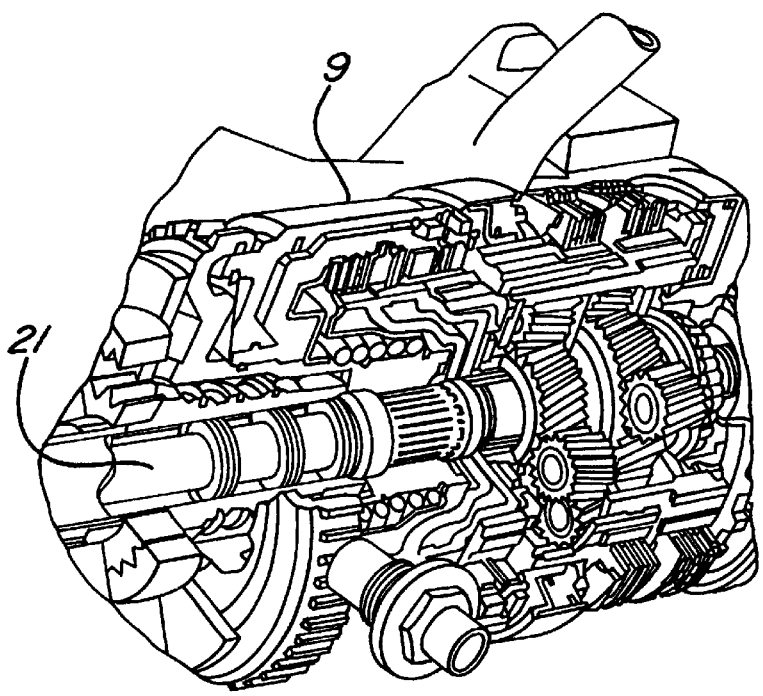
FIG. 3 is a perspective and broken away sectional view of an automatic transmission showing the relationship between the subject clutch package and other parts of the transmission.
Figure 4:
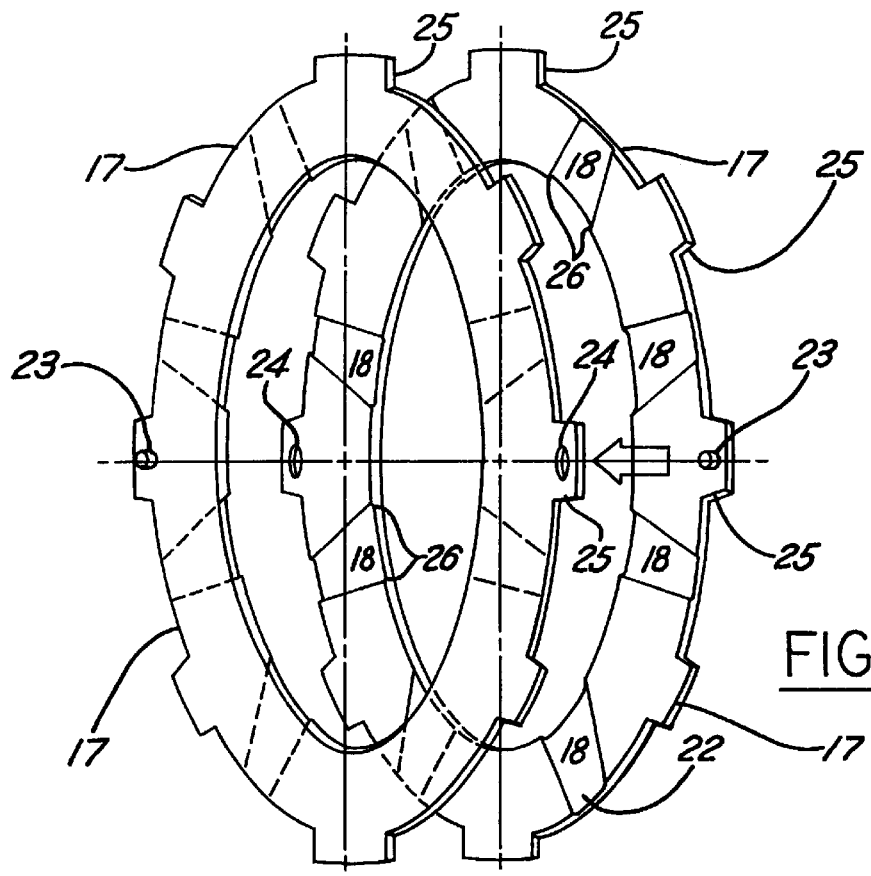
FIG. 4 is a perspective view of the two-piece steel separator plate assembly showing oil cooled passages and an indexing mechanism.

Looking to FIG. 3, a broken away and perspective view of an automatic transmission (such as the DaimlerChrysler 41TE) shows the spatial relationship of the clutch package assembly 9 to other transmission components. The above described cooling oil flow would be supplied from a central region as occupied by input shaft 21 and be centrifugally ejected to the underside of the rotating member 10 so as to irrigate the steel separator plates for clutch cooling as previously detailed. It should be understood that because of the compact design of the 41TE transmission, removal of one separator plate and of one clutch disc is very advantageous from a space standpoint. Also, it is clear that the above described concept can be applied to many applications other than vehicles, such as trucks, agricultural equipment, construction equipment, and aero-space. In FIG. 4, the two stamp-formed separator plates 17 are shown and each is identical to the other. Each plate 17 is approximately 1.5 mm thick with a 0.25–0.38 mm deep oil cooling channel 18 formed by a coining operation. A stamped locator projection 23 and a slot 24 are formed at diametrically opposite sides in each plate 17. When one plate is turned around as in FIG. 4, the two plates are brought together in the assembled stage and the aligned channels 18 form significant flow passages for oil to cool the plates. In the preferred example, the resultant passages are approximately 0.50–0.76 mm wide and about 0.50–0.76 in depth. It should be appreciated that the locator projections 23 and slots 24 are required only to hold plate elements 17 together prior to assembling to the clutch retainer 3. This assembly technique assures that the oil cooling passages will always match. The locator projection 23 and slot 24 permit slight movement in the circumferential direction of the members 17 so during installation the anti-rotation lugged edge formation of the plates 1 and discs 2 can be lined-up with an associated spine. It also should be noted that the geometry of the oil cooling channel 18 could be designed so as to prevent buckling of the plate and to efficiently collect cooling oil at inner area 26

Figure 5:
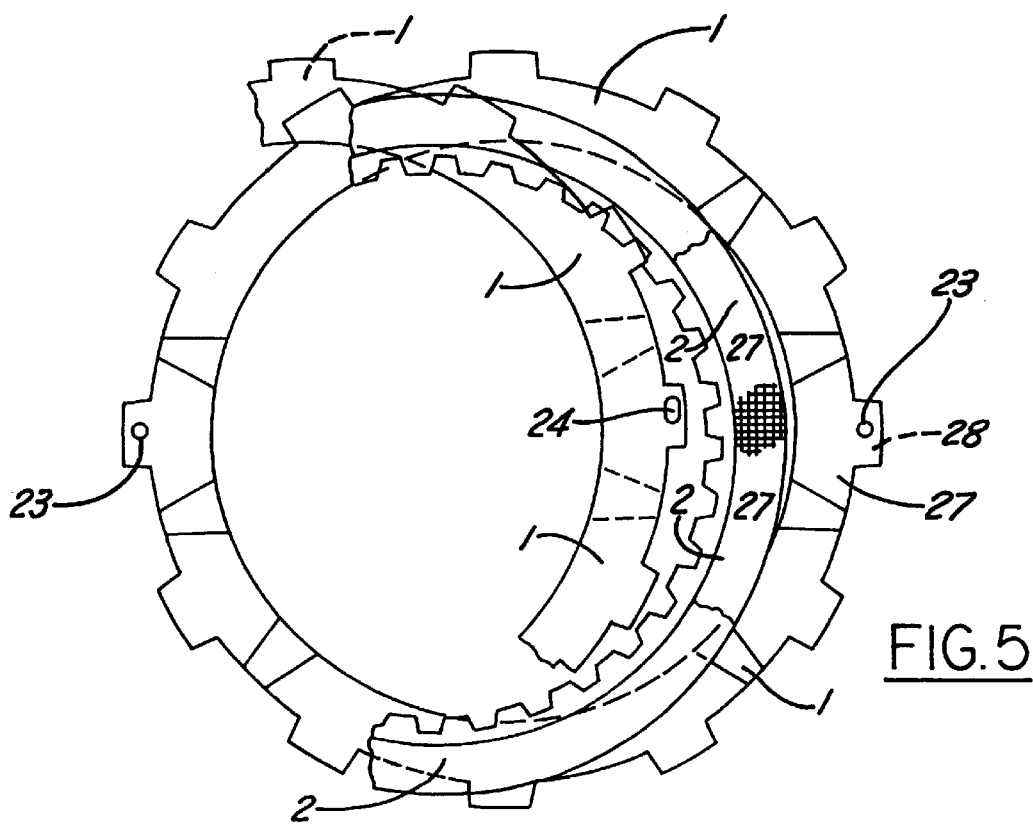
FIG. 5 is an end view of the two-piece steel separator plate assembly.

In FIG. 5, separator plates 1 and a friction clutch disc 2 are shown staggered to better illustrate the relationship between the projection 23 in one plate to the friction material 27. The projection locating feature 23 would be sized and positioned on a lug 28 of a plate so as to engage only the adjacent separator plate of the assembly and not the friction material 27.

Figure 7:
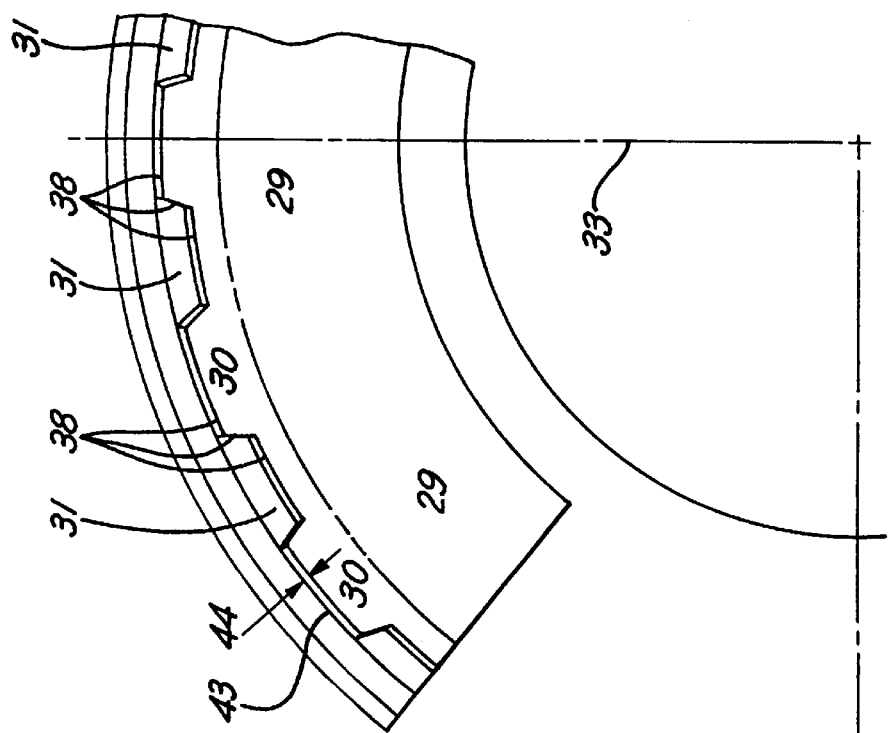
FIG. 7 is a partial end view of the structure shown in FIG. 6.
Figure 6:
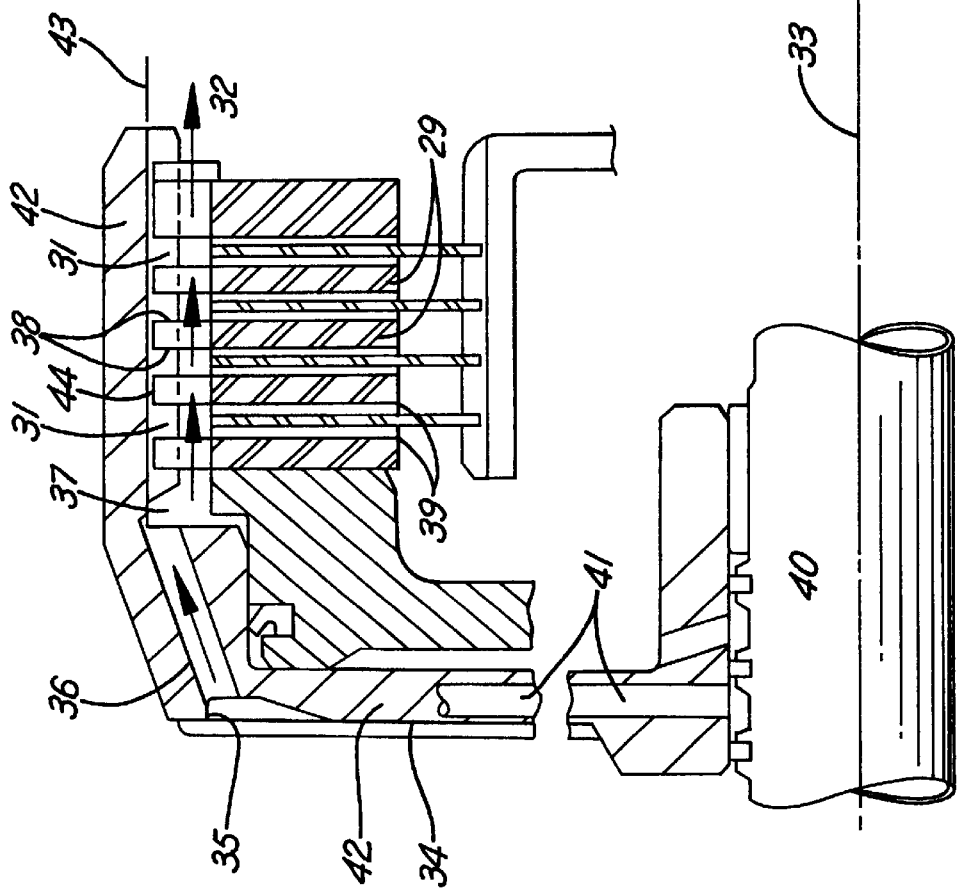
FIG. 6 is a side sectional view of an automatic transmission with another embodiment of a cooling system for a clutch package showing oil flow past portions of the clutch plates for cooling.

FIGS. 6 and 7 illustrate another embodiment of the oil cooled clutch plate assembly and system. Specifically, the assembly's retainer portion 42 supports a plurality of one-piece steel separator plates 29 at there radially outer edge portion configured with anti-rotation lug portions 30. Specifically, the anti-rotation lugs 30 engage a plurality of axial extending splines 31 formed by the retainer portion 42. The cooling and lubricating oil flows in the direction of arrow 32 along the splines 31 and past the separator plate's lug portions 30. The aforementioned cooling oil is initially thrown centrifugally outwardly from the center portion or line 33 along a surface 34 and into a catch well space 35. The oil then travels from space 35 through a plurality of angular holes 36 to a diametrical undercut space 37 where it then flows around and over the surfaces 38 of the lug configurations of the separator plates 29. Resultantly, heat is conducted from friction surfaces 39 of the separator plate 29. It should be understood that the cooling surfaces 38 of the lugs are formed around the outer diameter of the one piece steel separator plate 29 and thus generates an optimal surface area for oil flow and resultant cooling. To increase the surface area 38, a greater number of lugs 30 could be employed along with a corresponding increase in the number of splines 31. Also, the depth of the spline structure and corresponding lugs could to made greater.

For further improving the cooling capacity, oil could be fed from the main supply within shaft 40 and directed through a passage 41 to the angular holes 36. This arrangement would provide a greater supply of oil to irrigate the cooling surfaces 38 and the higher volume and velocity of the oil would be capable of extracting a larger quantity of heat energy from the steel separator plates 29. As the oil is supplied into holes 36 to the undercut space 37 it is trapped by the wall of the retainer portion 42 so that the oil is forced to flow axially along the major spline diameter 43. The oil then flows through spaces 44 defined between anti-rotation lugs 30 and the wall 42. As the oil flows, heat is extracted or exchanged from the hotter plates 29. It should be appreciated that the flow of cooling oil continues past anti-rotation lugs 30 before, during, and after activation of the clutch assembly which is when heat is generated.

Figure 8:
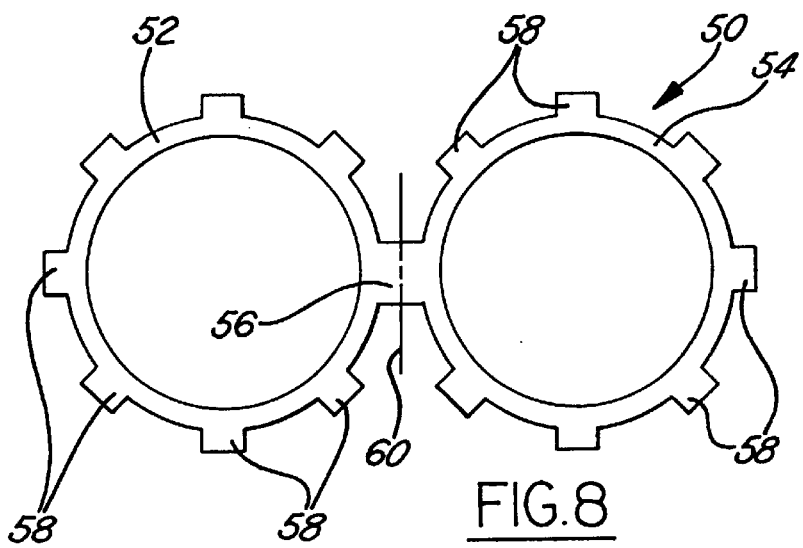
FIG. 8 is a view of a one-piece clutch plate prior to a folding operation to form a laminated structure functioning like the two-piece structure of FIG. 4.
Figure 8A:
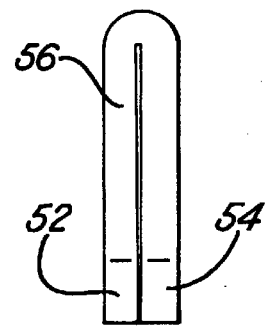
FIG. 8a is a sectional view of the folded over connection between the portions of the laminated structure of FIG. 8.

In FIG. 8, a one-piece but two-plate separator plate blank 50 is illustrated. The blank 50 consists of two generally annular or washer-shaped portions 52, 54 connected by a thin strip portion 56. Lug portions 58 are formed about the outer periphery of the portions 52, 54. The one-piece separator assembly is completed by folding the portions 52, 54 back against one another at line 60 across strip 56. The folded portion along line 60 is best seen in FIG. 8a.

Figure 9:
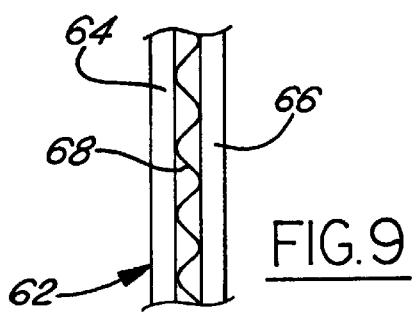
FIG. 9 is a sectional view of a two plate structure with a corrugated separator member between two solid plates.
Figure 10:
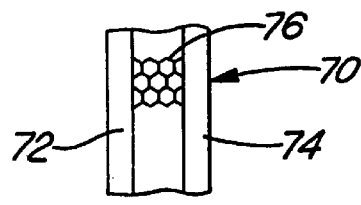
FIG. 10 is a sectional view of a two plate structure with a honeycomb configuration separating two solid plates.

Another separator plate configuration 62 is shown in FIG. 9 where the two plates 64, 66 sandwich a generally corrugated shape spacer 68. A still further separator plate configuration 70 is shown in FIG. 10 where the two plates 72, 74 are separated by a honeycomb structure or spacer 76 which is used like the spacer 68 in FIG. 9.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and the following claims.

We claim:

1. An oil cooling system for a stacked plate type clutch package assembly, the assembly including a stacked plate arrangement of alternating separator plates and clutch plates housed within a retainer and the stacked plate arrangement, when assembled, creates a path for oil flow therethrough, wherein the oil cooling system comprises:

an oil supply delivery arrangement positioned at a central shaft of the clutch package assembly for producing radially outward oil flow; and a flow passage structure arranged relative to the retainer and stacked plate arrangement to provide a secondary oil path for the radially outward oil flow additional to the flow path through the stacked plate arrangement, wherein said radially outward oil flow through the secondary flow path comes into heat exchange contact initially with an outermost surface of the separator plates, said flow passage structure comprising a plurality of passages each providing a flow path along an axial wall of the retainer and a radial passage in the retainer, said radial passage arranged in fluid communication with said oil supply delivery arrangement and said plurality of passages to allow oil flow from said oil supply delivery arrangement to said plurality of passages and into heat exchange contact initially with the outermost surface of the separator plates for cooling of the plates.

2. The oil cooling system of claim 1, wherein the flow passage structure further comprises a diametrical undercut in the secondary flow path to direct the oil flow toward the separator plates.

3. The oil cooling system of claim 1, wherein an axial oil flow path is formed by a spaced relationship between a plurality of splines formed by an inner circumferential wall of the retainer and a corresponding plurality of anti-rotation lugs extending outwardly from each separator plate.

* * * * *